UNITED STATES PATENT OFFICE.

CHRISTIAN RUDOLPH AND EMIL VOGES, OF OFFENBACH-ON-THE-MAIN, GERMANY, ASSIGNORS TO THE FIRM OF K. OEHLER, OF SAME PLACE.

YELLOW DYE.

SPECIFICATION forming part of Letters Patent No. 568,549, dated September 29, 1896.

Application filed March 27, 1896. Serial No. 585,122. (Specimens.)

*To all whom it may concern:*

Be it known that we, CHRISTIAN RUDOLPH, chemist, and EMIL VOGES, chemist, residing at Offenbach-on-the-Main, Germany, have invented new and useful Improvements in the Manufacture of a New Yellow Tetrazo Dyestuff, of which the following is a specification.

In the course of examination of toluylendiamin-sulfo-acid ($CH_3.NH_2.SO_3H.NH_2 = 1.2.4.6$) in regard to its employment for the preparation of coloring-matters, dyeing unmordanted cotton, we have found that a yellow substantive cotton dye can be obtained if the tetrazo compound of the before-mentioned diamin-sulfo-acid is made to act upon two molecules of nitro-meta-phenylene-diamin.

In the following example we shall describe the manner in which our invention may be carried out and brought into practical effect. Parts are parts by weight.

The solution of eleven and one-fifth (11.2) parts of the sodium salt of toluylendiamin-sulfo-acid ($CH_3.NH_2SO_3H.NH_2 = 1.2.4.6$) and six and nine-tenths (6.9) parts of sodium nitrite in about five hundred (500) parts of icy-cold water is poured into an ice-cooled diluted hydrochloric acid containing fifty (50) parts of said acid of $22\frac{1}{2}°$ Baumé in every one hundred (100) parts of the diluted acid. After the nitrous acid has disappeared the liquor is poured into a solution of fifteen and a half (15.5) parts of nitro-meta-phenylene-diamin in the calculated quantity of diluted muriatic acid and an orange mass precipitates at once. The whole is allowed to stand for twenty-four hours, then heated to boiling. The resulting dyestuff acid is converted into its sodium salt by addition of thirty-five (35) parts of soda, salted out and dried.

The dyestuff thus obtained forms a light-brown powder, which is soluble in water to a yellow solution, from which a gelatinous yellowish precipitate falls down on addition of an acid.

The coloring-matter produced in the manner above described dyes unmordanted cotton, giving clear yellow shades. When, in the process above described, an acetic-acid solution is used, very much dimmer shades are yielded by the resulting dyestuff.

Now what we claim, and desire to secure by Letters Patent, is the following:

1. The process of making a yellow tetrazo dyestuff, which consists in the combination of diazotized toluylendiamin-sulfo-acid ($CH_3.NH_2.SO_3H.NH_2 = 1.2.4.6$) with nitro-meta-phenylene-diamin.

2. As a new article of manufacture the yellow tetrazo dyestuff, deriving from toluylendiamin-sulfo-acid, and being characterized by the following properties, it forms a light-brown powder, which dissolves in water to a yellow solution, from which a gelatinous precipitate is obtained by the addition of an acid and which dyes unmordanted cotton from an alkaline-soap bath a pure yellow.

In testimony whereof we have signed our names to this specification in the presence of two subscribing witnesses.

CHRISTIAN RUDOLPH.
EMIL VOGES.

Witnesses:
DEAN B. MASON,
JEAN GRUND.